US012375480B2

(12) United States Patent
Nakamura

(10) Patent No.: US 12,375,480 B2
(45) Date of Patent: Jul. 29, 2025

(54) OCCUPANT-DEPENDENT SETTING SYSTEM FOR VEHICLE, AND VEHICLE

(71) Applicant: SUBARU CORPORATION, Tokyo (JP)

(72) Inventor: Ryota Nakamura, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 403 days.

(21) Appl. No.: 17/872,065

(22) Filed: Jul. 25, 2022

(65) Prior Publication Data
US 2023/0063761 A1    Mar. 2, 2023

(30) Foreign Application Priority Data

Aug. 3, 2021  (JP) ................ 2021-127472

(51) Int. Cl.
*G06F 21/00* (2013.01)
*B60N 2/00* (2006.01)
*B60N 2/02* (2006.01)
*H04L 9/40* (2022.01)

(52) U.S. Cl.
CPC ........ *H04L 63/0861* (2013.01); *B60N 2/0024* (2023.08); *B60N 2/0248* (2013.01);
(Continued)

(58) Field of Classification Search
CPC . H04L 63/0861; B60N 2/0024; B60N 2/0248; B60N 2/0279; B60N 2/0022;
(Continued)

(56) References Cited

U.S. PATENT DOCUMENTS

| 9,229,905 B1* | 1/2016 | Penilla ................ G06Q 20/18 |
| 10,917,259 B1* | 2/2021 | Chein ................. H04L 12/282 |

(Continued)

FOREIGN PATENT DOCUMENTS

| JP | 2004-243825 A | 9/2004 |
| JP | 2007-314014 A | 12/2007 |

(Continued)

OTHER PUBLICATIONS

Office Action dated Apr. 30, 2025 issued in Japanese Patent Application 2021-127472 (including English translation).

*Primary Examiner* — Kendall Dolly
(74) *Attorney, Agent, or Firm* — TROUTMAN PEPPER LOCKE LLP

(57) ABSTRACT

An occupant-dependent setting system for a vehicle includes a setting processor, a combination authentication processor, and a memory. The setting processor provides the vehicle with setting to make occupant-dependent setting available in the vehicle. The combination authentication processor authenticates a combination of an occupant on board the vehicle and the vehicle. The memory holds personalized setting data. On the condition that the combination of the occupant and the vehicle is authenticated by the combination authentication processor, the setting processor acquires the personalized setting data regarding the occupant authenticated by the combination authentication processor from the memory and provides the vehicle with the setting.

8 Claims, 6 Drawing Sheets

(52) U.S. Cl.
CPC .......... *B60N 2/0279* (2023.08); *B60N 2/0022* (2023.08); *B60N 2/0023* (2023.08); *B60N 2/0273* (2023.08); *B60N 2210/24* (2023.08); *B60N 2230/20* (2023.08)

(58) Field of Classification Search
CPC ................ B60N 2/0023; B60N 2/0273; B60N 2210/24; B60N 2230/20; G07C 9/00309; G07C 2209/63; G07C 9/00563; G07C 9/00571; G06F 21/32; G06F 21/44; G06Q 50/40; B60R 16/037
See application file for complete search history.

(56) References Cited

U.S. PATENT DOCUMENTS

| | | | |
|---|---|---|---|
| 2004/0158373 A1* | 8/2004 | Nakaya | B60R 16/037 701/49 |
| 2014/0379169 A1* | 12/2014 | Camacho | H04L 67/306 709/219 |
| 2018/0010601 A1 | 1/2018 | Berthaud et al. | |
| 2018/0342001 A1* | 11/2018 | Chavarria | G06Q 30/0621 |
| 2019/0197221 A1* | 6/2019 | Okada | H04L 9/3231 |
| 2019/0389718 A1* | 12/2019 | Patil | G06Q 20/4014 |
| 2022/0109662 A1* | 4/2022 | Jenkins | H04W 12/35 |

FOREIGN PATENT DOCUMENTS

| | | |
|---|---|---|
| JP | 2009-043046 A | 2/2009 |
| JP | 2017-43268 A | 3/2017 |
| JP | 2017-515178 A | 6/2017 |
| JP | 2017-531112 A | 10/2017 |
| JP | 2019-113947 A | 7/2019 |
| WO | 2015-127256 A1 | 8/2015 |
| WO | 2015-191913 A2 | 12/2015 |
| WO | 2017-168687 A1 | 10/2017 |

* cited by examiner

OCCUPANT-DEPENDENT SETTING SYSTEM FOR VEHICLE, AND VEHICLE

CROSS-REFERENCE TO RELATED APPLICATION

This application claims priority from Japanese Patent Application No. 2021-127472 filed on Aug. 3, 2021, the entire contents of which are hereby incorporated by reference.

FIELD OF THE INVENTION

The technology relates to an occupant-dependent setting system for a vehicle, and a vehicle.

BACKGROUND

Some vehicles such as automobiles allow an occupant on board to adjust, for example, a seat position.

Moreover, in recent years, automobiles include advanced information devices. This makes it possible for an occupant to use a telematics service, a content service, and a sales service, while on board the automobile.

SUMMARY

An aspect of the technology provides an occupant-dependent setting system for a vehicle. The occupant-dependent setting system includes a setting processor, a combination authentication processor, and a memory. The setting processor is configured to provide the vehicle with setting to make occupant-dependent setting available in the vehicle. The combination authentication processor is configured to authenticate a combination of an occupant on board the vehicle and the vehicle. The memory is configured to hold personalized setting data. The personalized setting data is made available in the vehicle to the occupant to be on board the vehicle on the condition that the combination of the occupant and the vehicle is authenticated by the combination authentication processor. On the condition that the combination of the occupant and the vehicle is authenticated by the combination authentication processor, the setting processor is configured to acquire the personalized setting data regarding the occupant authenticated by the combination authentication processor from the memory and provide the vehicle with the setting.

An aspect of the technology provides a vehicle. The vehicle includes at least a setting processor, out of the setting processor, a combination authentication processor, and a memory. The setting processor is configured to provide the vehicle with setting to make occupant-dependent setting available in the vehicle. The combination authentication processor is configured to authenticate a combination of an occupant on board the vehicle and the vehicle. The memory is configured to hold personalized setting data. The personalized setting data is made available in the vehicle to the occupant to be on board the vehicle on the condition that the combination of the occupant and the vehicle is authenticated by the combination authentication processor. On the condition that the combination of the occupant and the vehicle is authenticated by the combination authentication processor, the setting processor is configured to acquire the personalized setting data regarding the occupant authenticated by the combination authentication processor from the memory and provide the vehicle with the setting.

An aspect of the technology provides a vehicle. The vehicle includes circuitry, out of the circuitry and a memory. The circuitry is at least configured to provide the vehicle with setting to make occupant-dependent setting available in the vehicle, out of: being configured to provide the vehicle with the setting to make the occupant-dependent setting available in the vehicle; and being configured to authenticate a combination of an occupant on board the vehicle and the vehicle. The memory is configured to hold personalized setting data. The personalized setting data is made available in the vehicle to the occupant to be on board the vehicle on the condition that the combination of the occupant and the vehicle is authenticated by the circuitry. On the condition that the combination of the occupant and the vehicle is authenticated by the circuitry, the circuitry is configured to acquire the personalized setting data regarding the occupant authenticated by the circuitry from the memory and provide the vehicle with the setting.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
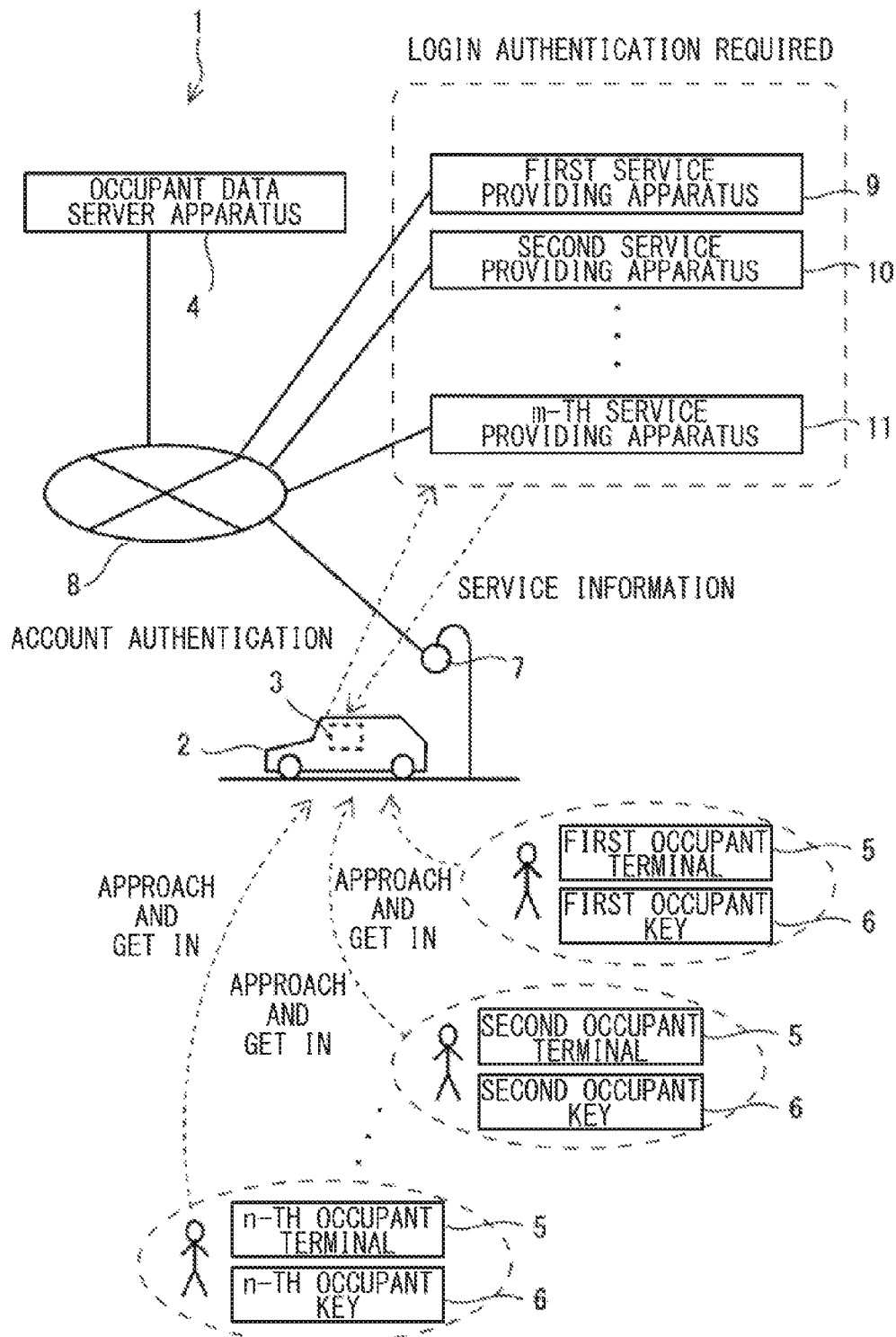
FIG. 1 is a schematic diagram of a vehicle setting system for an automobile according to an embodiment of the technology.

In an automobile provided with an advanced information device, after an occupant gets in the automobile, the occupant may adjust a seat position according to their physical constitution, and make an operation to establish connection to various network services such as a telematics service.

This hinders the occupant from starting travel immediately after they get in the automobile.

In particular, in a case where the occupant wants to use a plurality of the network services while on board, the occupant has to make the operation to establish connection one by one to the plurality of the network services they want to use. This is quite inconvenient.

A possible countermeasure against such a situation may include allowing the automobile to record setting data in a vehicle memory or a server apparatus with which the automobile can communicate. For example, reference is made to Japanese Unexamined Patent Application Publication (JP-A) Nos. 2004-243825 and 2017-043268.

In the case where the setting data is recorded as described above, in the automobile, it is necessary to identify and authenticate an occupant on board the automobile to keep the setting data from being available to anyone who gets in the automobile. For example, reference is made to JP-A Nos. 2017-043268 and 2019-113947.

Combining these techniques makes it possible for the automobile to identify an occupant on board by, for example, biometric authentication, acquire personalized setting data held in the automobile or the server apparatus, and provide setting to make the acquired data available in the automobile.

However, depending on the contents of the setting data, it would not be sufficiently safe to make the personalized setting data held in the automobile or the server apparatus acquirable and available solely on the basis of the authentication of the occupant on board. For example, it is assumed that account data at a settlement service to be used in a sales service, etc. is strongly requested to be kept unavailable to other people except for an authorized occupant. If the data becomes available by simply identifying and authenticating an occupant, there is not low possibility that the settlement service is illegally acquired or used by another person due to, for example, spoofing. High safety is desired to prevent the personalized setting data from being used by other people.

It is desirable to enhance safety of personalized setting data to be used in a vehicle, while ensuring convenience of authorized use.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

FIG. 1 is a schematic diagram of a vehicle setting system 1 for an automobile 2 according to an embodiment of the technology.

The vehicle setting system 1 in FIG. 1 is configured to provide an automobile 2 with occupant-dependent setting. An occupant such as a driver gets in the automobile 2. The vehicle setting system 1 may include, without limitation, a control system 3 of the automobile 2, and an occupant data server apparatus 4. The occupant data server apparatus 4 is configured to perform data communication with the control system 3. In one embodiment of the technology, the automobile 2 may serve as a "vehicle" an occupant gets in.

An occupant who gets in the automobile 2 may carry an occupant terminal 5 and an occupant key 6. The occupant may approach the automobile 2 and get in the automobile 2. FIG. 1 illustrates a plurality of the occupants who shares the single automobile 2. A first occupant carries a first occupant terminal 5 and a first occupant key 6. A second occupant carries a second occupant terminal 5 and a second occupant key 6. An n-th occupant carries an n-th occupant terminal 5 and an n-th occupant key 6, where n is a natural number of 1 or greater. In each of the occupant terminals 5, an application program for management or use of the automobile 2 may be installed. The occupant terminal 5, as with the occupant key 6, may be configured to carry out a control of unlocking the automobile 2 when the occupant approaches the automobile 2.

The control system 3 of the automobile 2 as a moving body may establish a communication path with a base station 7 around the automobile 2 and perform data communication with the occupant data server apparatus 4 through the base station 7 and a communication network 8. The base station 7 and the communication network 8 may include those for 5G provided by telecommunication carriers, or those for, for example, ADAS (Advanced Driver Assistance System) provided by, for example, public organizations.

Moreover, the control system 3 of the automobile 2 may be coupled to each of a plurality of service providing apparatuses 9 to 11 through the base station 7 and the communication network 8. The plurality of the service providing apparatuses 9 to 11 is used in the automobile 2 by the occupant. The control system 3 of the automobile 2 may transmit and receive service information to and from the plurality of the service providing apparatuses 9 to 11. FIG. 1 illustrates, as the plurality of the service providing apparatuses 9 to 11 that provides such network services, a first service providing apparatus 9, a second service providing apparatus 10, . . . , and an m-th service providing apparatus 11, where m is a natural number of 1 or greater. The plurality of the occupants who uses the automobile 2 may basically use network services provided by the different service providing apparatuses from one another, in the automobile 2 they share. Non-limiting examples of the network services may include telematics services, video and audio content provision services, sales services, settlement services, navigation services for route guidance and an automated driving control, information provision services such as tourist destinations, search provision services such as the World Wide Web, communication services such as telephones and conferences, online travel control services for, for example, a travel control of the automobile 2, and other application services. In a case where a user such as an occupant uses the network services, the user is often requested to obtain account data at each network service.

Figure 2:
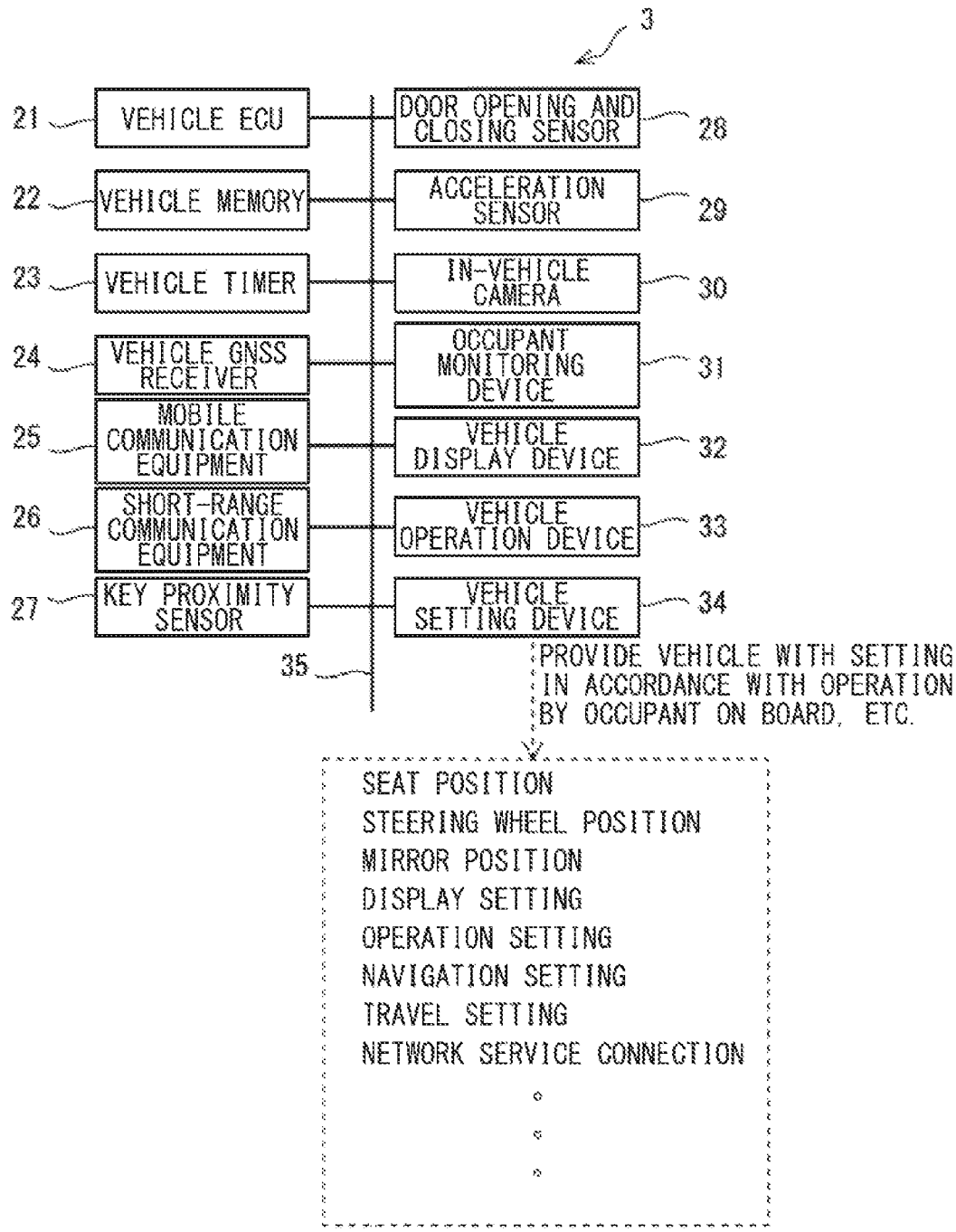
FIG. 2 is a block diagram of a control system of the automobile in FIG. 1.

FIG. 2 is a block diagram of the control system 3 of the automobile 2 in FIG. 1.

The control system 3 of the automobile 2 in FIG. 2 may include, without limitation, a vehicle ECU (Electronic Control Unit) 21, a vehicle memory 22, a vehicle timer 23, a vehicle GNSS (Global Navigation Satellite System) receiver 24, a mobile communication equipment 25, a short-range communication equipment 26, a key proximity sensor 27, a door opening and closing sensor 28, an acceleration sensor 29, an in-vehicle camera 30, an occupant monitoring device 31, a vehicle display device 32, a vehicle operation device 33, a vehicle setting device 34, and a vehicle network 35 to which these are coupled.

The vehicle network 35 may include, without limitation, a wired communication network for the automobile 2 in conformity with, for example, CAN (Controller Area Network) and LIN (Local Interconnect Network). The vehicle network 35 may include a communication network such as LAN, or a combination thereof. A portion of the vehicle network 35 may include a wireless communication network.

The vehicle GNSS receiver 24 may receive radio waves from GNSS satellites and generate a present position at which the automobile 2 is located, and the present time.

The vehicle timer 23 may measures time and the time. The time of the vehicle timer 23 may be calibrated by the present time of the vehicle GNSS receiver 24.

The mobile communication equipment 25 may establish, by wireless communication, a communication path with the base station 7 that includes the automobile 2 in its zone. This allows the mobile communication equipment 25 to perform data communication with the occupant data server apparatus 4 and the plurality of the service providing apparatuses 9 to 11 through the base station 7 and the communication network 8.

The mobile communication equipment 25 may directly communicate with mobile communication equipment of another automobile and establish the communication path with the base station 7 through the intermediary of the relevant automobile. This also allows the mobile communication equipment 25 to perform data communication with the occupant data server apparatus 4 and the plurality of the service providing apparatuses 9 to 11 through the mobile communication equipment of the intermediary automobile, the base station 7, and the communication network 8.

The key proximity sensor 27 may detect the occupant key 6 carried by an occupant in or near the automobile 2, by specific short-range wireless communication. The occupant key 6 may have identification data different from other occupant keys 6. The identification data regarding the occupant key 6 may be used as occupant identification data. For example, upon detecting the occupant key 6, the key proximity sensor 27 may generate a signal to unlock doors of the automobile 2 and output the signal to the vehicle network 35. This allows the doors of the automobile 2 to be automatically unlocked, allowing the occupant to open and close the doors of the automobile 2 and get in the automobile 2, for example, by just coming near the automobile 2, without unlocking the doors on their own. Moreover, in a case where the key proximity sensor 27 no longer detects the occupant key 6 of the occupant who has got off, the key proximity sensor 27 may generate a signal to lock the doors of the automobile 2 and output the signal to the vehicle network 35. This allows the doors of the automobile 2 to be automatically locked.

The short-range communication equipment 26 may establish, by short-range wireless communication, a communication path with the occupant terminal 5 carried by the occupant in or near the automobile 2. Non-limiting examples of short-range wireless communication standards may include IEEE (Institute of Electrical and Electronics Engineers) 802.15.1 and IEEE 802.11/b/g. Non-limiting examples of the occupant terminal 5 may include a mobile phone terminal and a wearable terminal that are configured to be coupled to the base station 7 of the telecommunication carriers. The short-range communication equipment 26 may detect, authenticate, and be coupled to the occupant terminal 5 carried by the occupant in or near the automobile 2. This allows the short-range communication equipment 26 to perform data communication with the occupant terminal 5.

The application program installed in the occupant terminal 5 for the management and the use of the automobile 2 may have different identification data from other application programs. In this case, when the occupant terminal 5 in which the application program is installed approaches the automobile 2, the short-range communication equipment 26 may generate a signal to unlock the doors of the automobile 2 and output the signal to the vehicle network 35, as with the key proximity sensor 27. Moreover, in a case where the short-range communication equipment 26 no longer detects the occupant terminal 5 of the occupant who has got off, the short-range communication equipment 26 may generate a signal to lock the doors of the automobile 2 and output the signal to the vehicle network 35. This allows the doors of the automobile 2 to be automatically locked.

The door opening and closing sensor 28 may detect opening and closing of the unillustrated doors of the automobile 2. In a case where the automobile 2 includes a plurality of doors, e.g., a door on side on which a driver's seat is disposed and a door on side on which a passenger seat is disposed, the door opening and closing sensor 28 may be provided for each door.

The acceleration sensor 29 may detect an acceleration rate of the automobile 2 traveling. The acceleration sensor 29 may integrate the acceleration rate and detect a speed of the automobile 2 together.

The in-vehicle camera 30 is provided in the automobile 2 for imaging of an inside of the automobile 2. The in-vehicle camera 30 may be of a narrow angle configured to perform imaging of only the driver of the automobile 2, or alternatively, the in-vehicle camera 30 may be of a wide angle configured to perform imaging of an entire cabin. A wide-angle captured image may include, along with the driver, an occupant as a fellow passenger other than the driver in the automobile 2. The captured image of the in-vehicle camera 30 may include biometric data regarding, for example, appearance of the occupant.

The occupant monitoring device 31 may detect and identify the occupant on board the automobile 2, and monitor a state of the occupant, on the basis of, for example, the captured image of the in-vehicle camera 30. The occupant may sometimes become drowsy, look aside, or have an abnormal heart rate while on board. The occupant monitoring device 31 may monitor the biometric data corresponding to these conditions, to determine the biometric data in real time on the basis of the captured image of the in-vehicle camera 30. In a case where the automobile 2 includes a millimeter-wave sensor that sends out a millimeter-wave toward inside the automobile, the occupant monitoring device 31 may use a detection result of the occupant by the millimeter-wave sensor together with the captured image of the in-vehicle camera 30, to detect and identify the occupant on board the automobile 2, and monitor the state of the occupant.

The vehicle display device 32 and the vehicle operation device 33 may constitute an HMI (Human Machine Interface) for the occupant in the automobile 2.

The vehicle display device 32 may include, without limitation, a liquid crystal display monitor. The vehicle display device 32 may be disposed in front of the driver's seat or in a center console, in the cabin of the automobile 2. The vehicle display device 32 may display an image for the occupant's view. A display screen of the vehicle display device 32 may include, for example, a setting screen to provide the automobile 2 with setting, a navigation screen, a meter screen that indicates a state of the automobile 2, a connection screen to the network service, a screen to provide the network service, without limitation.

The vehicle operation device 33 may include, without limitation, a touchscreen disposed on the liquid crystal display monitor. The vehicle operation device 33 may further include, without limitation, buttons, a pointing device, and a keypad. In a case where the vehicle operation device 33 constitutes a non-contact HMI, the vehicle operation device 33 may detect an operation on the basis of a motion of the occupant in the captured image of the in-vehicle camera 30. The occupant may make an operation, on the vehicle operation device 33, to allow the vehicle display device 32 to display, for example, the setting screen. Thus, the occupant may make an operation, on the setting screen, to set an initial screen or screen transitions of the vehicle display device 32. In addition, the occupant may make an operation, on the vehicle operation device 33, to allow the vehicle display device 32 to display, for example, the connection screen to the network service. Thus, the occupant may make an operation, on the connection screen, to input the account data.

The vehicle setting device 34 may provide each part of the automobile 2 with the occupant-dependent setting. For example, in a case where the occupant gets in the automobile 2 and makes a setting operation on, for example, the setting screen, the vehicle setting device 34 may acquire setting data and provide the automobile 2 with the setting. The vehicle setting device 34 may acquire data previously set by the occupant on board, from, for example, the vehicle ECU 21, and provide the automobile 2 with the setting. Non-limiting examples of the data to be set in the automobile 2 by the occupant on board the automobile 2 may include a seat position, a steering wheel position, a mirror position, display setting, operation setting, navigation setting, and travel setting.

The vehicle memory 22 may hold programs and data. The data to be held in the vehicle memory 22 may include, without limitation, various setting data and navigation data set by the occupant with the use of the vehicle operation device 33. In this case, the vehicle memory 22 may include, without limitation, an HDD (Hard Disk Drive) and/or an SSD (Solid State Disk) as a nonvolatile memory configured to hold data without power supply. The vehicle memory 22 may temporarily hold communication data transmitted and received by, for example, the mobile communication equipment 25 and the short-range communication equipment 26.

The vehicle ECU 21 may include, without limitation, a microcomputer. The vehicle ECU 21 may read the programs from the vehicle memory 22 and execute the programs. Thus, the vehicle ECU 21 may serve as a processor configured to make an overall operation control including the travel control of the automobile 2. The microcomputer may be integrated with, for example, the vehicle memory 22 and the vehicle timer 23.

The vehicle ECU 21 as the processor of the automobile 2 may make the travel control of the automobile 2 by, for example, automated driving.

The vehicle ECU 21 may generate the setting data on the basis of the setting operation made on the automobile 2 by the occupant with the use of the vehicle display device 32 and the vehicle operating device 33. The vehicle ECU 21 may record the setting data in the vehicle memory 22. In this case, the vehicle ECU 21 is configured to read the setting data held in the vehicle memory 22 and provide each part of the automobile 2 with the setting with the use of the vehicle setting device 34. In a case where the control system 3 of the automobile 2 is devoid of the vehicle setting device 34 configured to provide setting, the vehicle ECU 21 may provide each part of the automobile 2 with the setting on its own. This saves the occupant from making the setting operation every time they get in.

Figure 3:
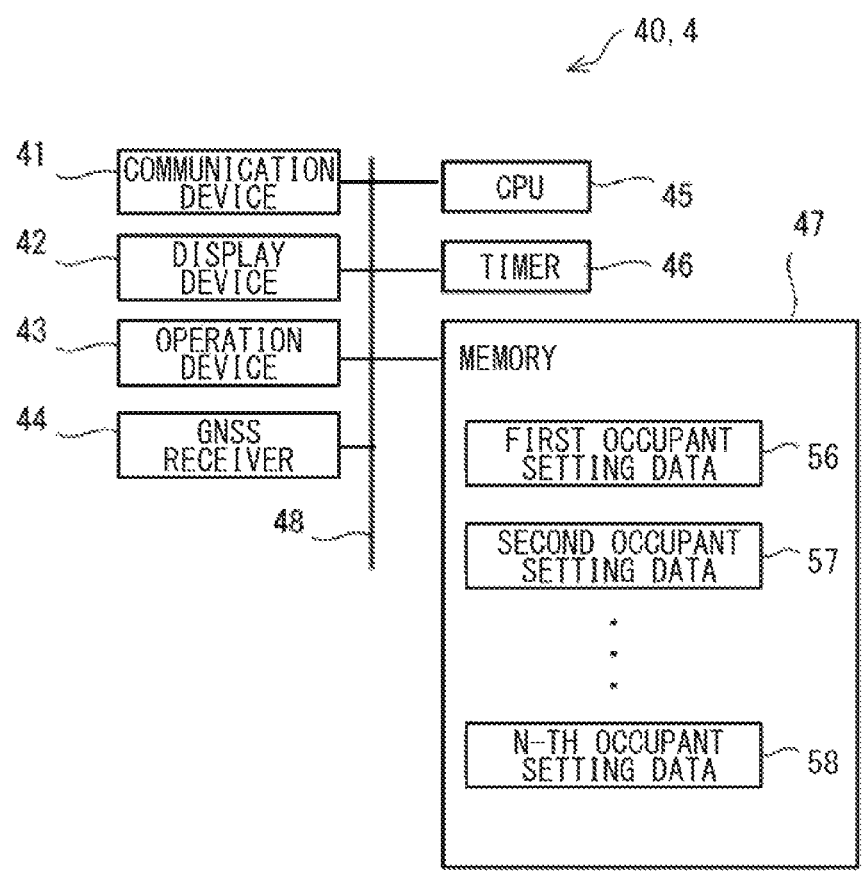
FIG. 3 is a block diagram of a computer apparatus that serves as an occupant data server apparatus in FIG. 1.

FIG. 3 is a block diagram of a computer apparatus 40 that serves as the occupant data server apparatus 4 in FIG. 1.

The computer apparatus 40 in FIG. 3 may include, without limitation, a communication device 41, a display device 42, an operation device 43, a GNSS receiver 44, a CPU 45, a timer 46, and a memory 47.

The plurality of the service providing apparatuses 9 to 11 in FIG. 1 may also include the computer apparatus 40 similar to FIG. 3.

The communication device 41 may be coupled to the communication network 8. The communication device 41 may transmit and receive communication data of the computer apparatus 40.

The display device 42 may include, without limitation, a liquid crystal display monitor. The display device 42 may provide an operator of the computer apparatus 40 with screen display.

The operation device 43 may include, without limitation, a keyboard and/or a pointing device. The operation device 43 may be operated by the operator of the computer apparatus 40.

The GNSS receiver 44 may receive the radio waves from the GNSS satellites and generate a position at which the computer apparatus 40 is located, and the present time.

The timer 46 may measure time and the time. The time of the timer 46 may be calibrated by the present time of the GNSS receiver 44.

The memory 47 may include, without limitation, non-volatile memory. The memory 47 may hold programs and data. For example, the memory 47 as the occupant data server apparatus 4 may hold programs and data to provide the automobile 2 with the setting.

The CPU 45 may include, without limitation, a microcomputer. The CPU 45 may read the programs from the memory 47 and execute the programs. Thus, the CPU 45 may serve as a processor configured to make an overall operation control of the computer apparatus 40.

As described, in the automobile 2 illustrated in FIG. 2, in a case where the occupant on board adjusts, for example, the seat position, the setting may be recorded in the vehicle memory 22. In a case where the occupant gets in again, the setting may be acquired from the vehicle memory 22 to provide the automobile 2 with the setting. This makes it possible to provide the automobile 2 with the occupant-dependent setting. It is possible to make the occupant-dependent setting available in the automobile 2.

In recent years, however, the automobile 2 may include, for example, the advanced mobile communication equipment 25. This makes it possible for the occupant to use, for example, the telematics service, the content service, and the sales service, while on board the automobile 2.

In such an automobile 2, after the occupant gets in the automobile 2, the occupant may adjust the seat position according to their physical constitution, and make an operation to establish connection to the various network services such as the telematics service.

This hinders the occupant from starting travel immediately after they get in the automobile 2.

In particular, in a case where the occupant wants to use a plurality of the network services while on board, the occupant has to make the operation to establish connection one by one to the plurality of the network services they want to use.

A possible countermeasure against such a situation may include allowing the automobile 2 to record the account data at the network services regarding each occupant in the vehicle memory 22 of the automobile 2 in FIG. 2. The account data may be read on the occasion of, for example, boarding, to allow the vehicle setting device 34 to establish the connection to the network services.

However, from the viewpoint of, for example, limitation on capacity of the vehicle memory 22 of the automobile 2 and data safety, it is not considered desirable to record all the account data at the network services regarding each occupant in the vehicle memory 22 of the automobile 2.

Thus, in this embodiment, as illustrated in FIG. 1, the occupant data server apparatus 4 is provided. As illustrated in FIG. 3, personalized setting data regarding the plurality of the occupants may be held in the memory 47 of the occupant data server apparatus 4. FIG. 3 illustrates first occupant setting data 56, second occupant setting data 57, and n-th occupant setting data 58, as the personalized setting data regarding the plurality of the occupants. Some kinds of the personalized setting data, e.g., the account data at the settlement service, requires high safety management. Recording such data in the memory 47 of the occupant data server apparatus 4 instead of the vehicle memory 22 of the automobile 2 makes it possible to enhance data safety. The personalized setting data regarding each occupant to be on board the automobile 2 may be basically held in the occupant data server apparatus 4.

In the following, description is given of balancing convenience and safety of authorized use of the personalized setting data to be used in the automobile 2.

Figure 4:
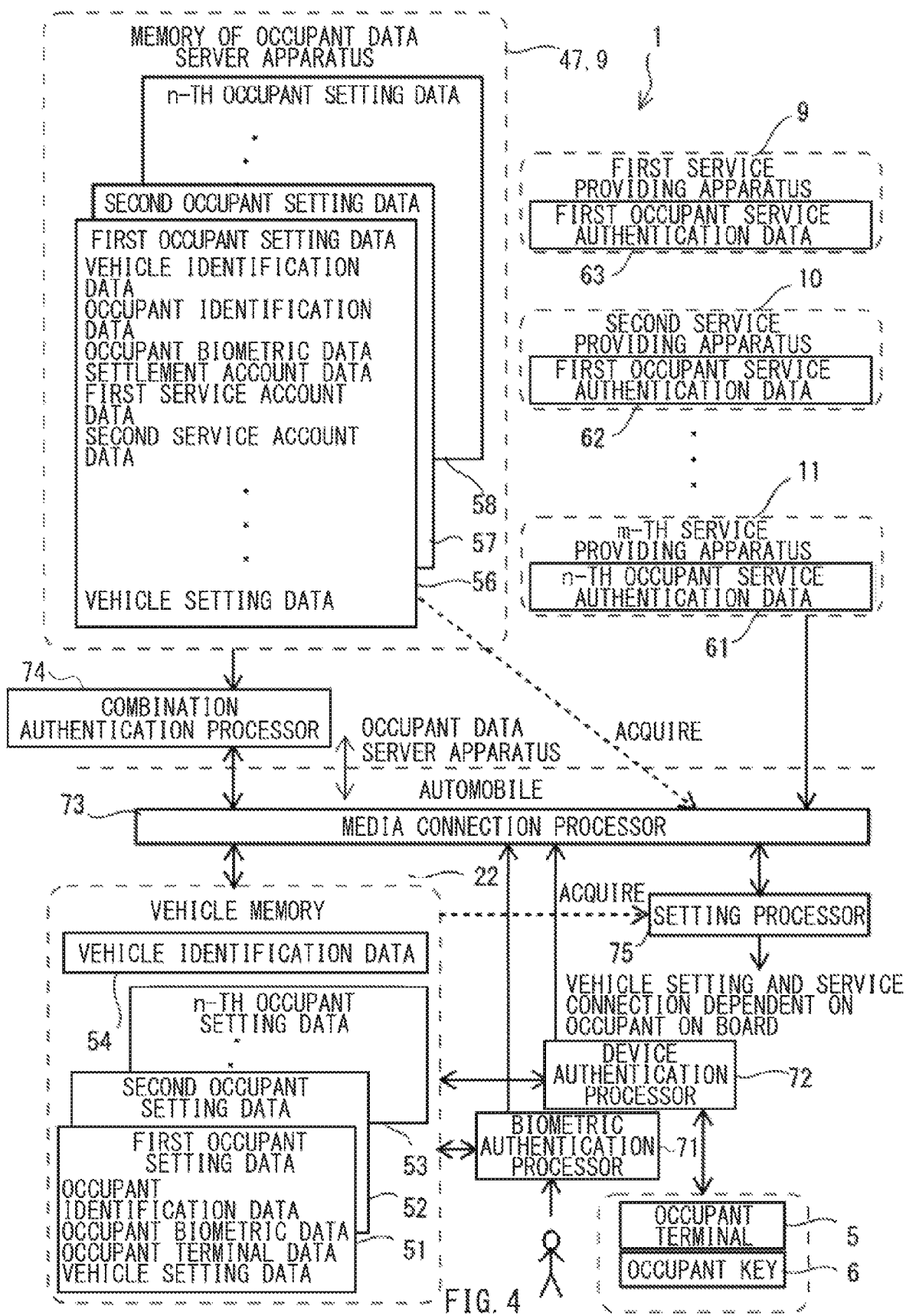
FIG. 4 is a block diagram illustrating where to record personalized setting data in the vehicle setting system for the automobile in FIG. 1, and a plurality of processors in the vehicle setting system.

FIG. 4 is a block diagram illustrating where to record the personalized setting data in the vehicle setting system 1 for the automobile 2 in FIG. 1, and a plurality of processors in the vehicle setting system 1.

FIG. 4 illustrates where to record the personalized setting data regarding the plurality of the occupants who uses the single automobile 2, and various processors to provide the automobile 2 with the setting of such data in accordance with the occupant on board.

In FIG. 4, in the vehicle memory 22 of the automobile 2, first occupant setting data 51, second occupant setting data 52, and n-th occupant setting data 53 may be held as the personalized setting data regarding the plurality of the occupants. In addition, for example, in the vehicle memory 22, vehicle identification data 54 may be held. The vehicle identification data 54 is different for each automobile 2.

For example, the first occupant setting data 51 regarding the first occupant may include authentication data, together with personalized vehicle setting data, i.e., vehicle setting data to be set in the automobile 2 by the first occupant for themselves. The authentication data may include, without limitation, occupant identification data, occupant biometric data, and data regarding the occupant terminal 5 carried by the first occupant. The occupant identification data may be allotted to the first occupant by, for example, the occupant monitoring device 31 of the automobile 2. The occupant biometric data may indicate physical features of, for example, the head of the first occupant. In the following, the data regarding the occupant terminal 5 is referred to as occupant terminal data.

The personalized setting data regarding other occupants, e.g., the second occupant setting data 52 regarding the second occupant and the n-th occupant setting data 53 regarding the n-th occupant, may also include, without limitation, the personalized vehicle setting data, the occupant identification data, the occupant biometric data, and the occupant terminal data.

As described, the personalized vehicle setting data regarding each occupant who uses the automobile 2 may be recorded in the vehicle memory 22 of the automobile 2. This makes it possible for the automobile 2 to make a setting control in accordance with the occupant on board, even under a situation in which communication with the outside is unavailable. The vehicle memory 22 may hold the personalized vehicle setting data regarding the occupant to be on board the automobile 2, within the personalized setting data regarding the plurality of the occupants. In one embodiment of the technology, the vehicle memory 22 may serve as a "vehicle memory".

In the memory 47 of the occupant data server apparatus 4, the first occupant setting data 56, the second occupant setting data 57, and the n-th occupant setting data 58 may be held as the personalized setting data regarding the plurality of the occupants.

For example, the first occupant setting data 56 regarding the first occupant may include, without limitation, the occupant identification data regarding the first occupant, the occupant biometric data regarding the first occupant, and the vehicle identification data regarding the automobile 2 the first occupant uses, together with the personalized setting data. The personalized setting data may include, without limitation, settlement account data, first service account data, and second account data the first occupant uses. The first service account data corresponds to service authentication data 63 regarding the first occupant held in the memory 47 of the first service providing apparatus 9 for authentication of the first occupant. The second service account data corresponds to service authentication data 62 regarding the first occupant held in the memory 47 of the second service providing apparatus 10 for the authentication of the first occupant. The first occupant setting data 56 may further include, without limitation, the personalized vehicle setting data regarding, for example, the seat position of the automobile 2.

The personalized setting data regarding other occupants, e.g., the second occupant setting data 57 regarding the second occupant and the n-th occupant setting data 58 regarding the n-th occupant, may also include, without limitation, the personalized setting data, the occupant identification data, the occupant biometric data, and the vehicle identification data. The personalized setting data regarding other occupants may further include, without limitation, the personalized vehicle setting data regarding, for example, the seat position of the automobile 2.

In the memory 47 of the m-th service providing apparatus 11, service authentication data 61 regarding the n-th occupant may be held for authentication of the n-th occupant. In this case, the personalized setting data within the n-th occupant setting data 58 may include, without limitation, m-th service account data. The m-th service account data corresponds to the service authentication data 61 regarding the n-th occupant in the m-th service providing apparatus 11. The m-th service providing apparatus 11 may provide the n-th occupant with service information on the basis of the authentication, but refrain from providing the first occupant with the service information. The first occupant does not use service by the m-th service providing apparatus 11.

The vehicle identification data to be held in the memory 47 of the occupant data server apparatus 4 may coincide with the vehicle identification data 54 to be held in the vehicle memory 22 of the automobile 2.

The occupant identification data and the occupant biometric data to be held in the memory 47 of the occupant data server apparatus 4 for the authentication of each occupant may correspond to the occupant identification data and the occupant biometric data to be held for each occupant in the vehicle memory 22 of the automobile 2. In a case where the authentication is made on the basis of the coincidence of the occupant identification data and the occupant biometric data, these pieces of data coincide. In this case, the occupant biometric data serves as a password.

As described, the memory 47 of the occupant data server apparatus 4 may hold the personalized vehicle setting data regarding the occupant to be on board the automobile 2, within the personalized setting data regarding the plurality of the occupants. In one embodiment of the technology, the memory 47 of the occupant data server apparatus 4 may serve as a "server memory" of a "server apparatus".

It suffices that the personalized vehicle setting data to be held in, for example, the first occupant setting data 56, the second occupant setting data 57, and the n-th occupant setting data 58 in the memory 47 of the occupant data server apparatus 4 basically coincides with the personalized vehicle setting data regarding the corresponding occupants in the vehicle memory 22 of the automobile 2. However, the personalized vehicle setting data to be held in the memory 47 of the occupant data server apparatus 4 may differ from that in the vehicle memory 22. The personalized vehicle setting data that differs from that in the vehicle memory 22 may include vehicle setting data recommended on the basis of a physical constitution and the age of each occupant. Such vehicle setting data may be recommended on the basis of, for example, statistic data regarding physical constitutions and the ages of occupants.

As illustrated in FIG. 4, the vehicle setting system 1 may mainly include, without limitation, a biometric authentication processor 71, a device authentication processor 72, a media connection processor 73, a combination authentication processor 74, and a setting processor 75. These processors may be realized by the apparatuses executing programs. In this embodiment, among these processors, the biometric authentication processor 71, the device authentication processor 72, the media connection processor 73, and the setting processor 75 may be realized by the vehicle ECU 21 of the control system 3 of the automobile 2. The remainders, i.e., the combination authentication processor 74, may be realized by the CPU 45 of the occupant data server apparatus 4. The processors in the vehicle setting system 1 may be assigned as appropriate to the vehicle ECU 21 of the control system 3 of the automobile 2 and to the CPU 45 of the occupant data server apparatus 4 in accordance with, for example, system specifications and design concepts.

The biometric authentication processor 71 may biometric-authenticate the occupant on board the automobile 2. The biometric authentication processor 71 may acquire, for example, the captured image of the occupant on board the automobile 2 with the use of, for example, the in-vehicle camera 30 of the automobile 2. The biometric authentication processor 71 may extract physical features about, for example, the head of the occupant included in the acquired data, and compare the features with the occupant biometric data regarding the plurality of the occupants registered in advance in the vehicle memory 22. The occupant biometric data registered in the vehicle memory 22 may include, without limitation, the captured image of the face of the occupant on the occasion of the registration of the occupant in the automobile 2. The captured image may include, without limitation, data such as facial features and a vein pattern of the head. In a case with presence of the occupant biometric data that coincides with the captured image of the occupant on board the automobile 2 at a certain degree of coincidence or higher, the biometric authentication processor 71 may authenticate the occupant whose occupant biometric data is included in the occupant data, as the occupant on board the automobile 2. In a case where the occupant biometric data regarding the plurality of the occupants held in the vehicle memory 22 includes the vein pattern of the head of each occupant or the vein pattern of a portion of the head of each occupant, it is possible for the biometric authentication processor 71 to authenticate accurately the occupant on board the automobile 2, without being affected by changes in the direction of the head of the occupant. The biometric authentication processor 71 may output a biometric authentication result of the occupant on board the automobile 2 to the media connection processor 73.

As described, in one embodiment of the technology, the biometric authentication processor 71 may serve a first example of an "occupant authentication processor" configured to authenticate an occupant on board a vehicle.

The device authentication processor 72 may authenticate a device carried by the occupant on board the automobile 2. The device authentication processor 72 may acquire, for example, the identification data regarding the occupant terminal 5 to which the short-range communication equipment 26 is coupled by wireless communication, with the use of, for example, the short-range communication equipment 26 or the key proximity sensor 27 of the automobile 2. The device authentication processor 72 may compare the identification data with the occupant terminal data regarding the plurality of the occupants held in the vehicle memory 22. In a case where the identification data regarding the occupant terminal 5 coincides with the occupant terminal data, the device authentication processor 72 may authenticate the occupant whose occupant terminal data is included in the occupant data, as the occupant on board the automobile 2. At this occasion, the device authentication processor 72 may determine whether or not the occupant terminal 5 is present in the vehicle on the basis of data such as a communication response speed between the short-range communication equipment 26 and the occupant terminal 5. The device authentication processor 72 may make the authentication as the occupant on board the automobile 2, only with respect to the occupant terminal 5 present in the vehicle. The device authentication processor 72 may output a device authentication result of the occupant terminal 5 carried by the occupant on board the automobile 2, to the media connection processor 73.

As described, in one embodiment of the technology, the device authentication processor 72 may serve a second example of the "occupant authentication processor" configured to authenticate the occupant on board the vehicle.

The media connection processor 73 may couple the automobile 2 to various server apparatuses coupled to the communication network 8, with the use of the mobile communication equipment 25, to carry out communication with the server apparatuses. The media connection processor 73 may couple the automobile 2 to, for example, the occupant data server apparatus 4 with the use of, for example, the mobile communication equipment 25, to carry out data communication with the occupant data server apparatus 4. The media connection processor 73 may couple the automobile 2 to the occupant data server apparatus 4 in a case where, for example, the biometric authentication result indicating the authentication is obtained from the biometric authentication processor 71.

The media connection processor 73 may acquire, from, for example, the vehicle memory 22 of the automobile 2, the data to be involved in authentication of connection to the CPU 45 of the occupant data server apparatus 4 for the occupant on board. The media connection processor 73 may transmit the acquired data to the combination authentication processor 74 of the occupant data server apparatus 4.

The combination authentication processor 74 may authenticate a combination of the occupant on board the automobile 2 and the automobile 2. For example, the combination authentication processor 74 may compare the data transmitted from the media connection processor 73 of the automobile 2 for the authentication of the connection, with the data held in the memory 47 of the occupant data server apparatus 4 for the authentication of the connection of the plurality of the occupants. The data transmitted from the automobile 2 for the authentication of the connection may include, without limitation, the captured image of the occupant on board the automobile 2 or the biometric data regarding the occupant based on the captured image, and the vehicle identification data 54 regarding the automobile 2. In a case where all the transmitted data coincides with the data held in the memory 47 of the occupant data server apparatus 4, the combination authentication processor 74 may give an approval of the connection. Otherwise, the combination authentication processor 74 does not have to give the approval of the connection. Upon giving the approval of the connection, the combination authentication processor 74 may notify the setting processor 75 of the approval of the connection through the media connection processor 73 of the automobile 2.

It is generally considered to be sufficient that the data to be transmitted by the media connection processor 73 to the occupant data server apparatus 4 for the authentication of the connection includes the occupant identification data regarding the biometric-authenticated or device-authenticated occupant, and a password. However, in this embodiment, the data to be involved in the authentication of the connection may further include, without limitation, the vehicle identification data 54 regarding the automobile 2 to which the approval is given. This makes it possible for the combination authentication processor 74 of the occupant data server apparatus 4 to not only authenticate that the connection is being established for the registered regular occupant, but also authenticate that the regular occupant is attempting the connection from the regular automobile 2. With the combination authentication processor 74, it is possible for the occupant data server apparatus 4 to authenticate the combination of the regular occupant and the regular automobile 2. Moreover, with the vehicle identification data 54, it is possible for the occupant data server apparatus 4 to authenticate that the connection is established from the legitimate, regular automobile 2. Even in a case where the regular occupant attempts to get the authentication of the connection by an unregistered route from the automobile 2 having the vehicle identification data which is not registered in their personalized setting data 56 to 58 held in the memory 47 of the occupant data server apparatus 4, the occupant data server apparatus 4 may keep from authenticating the connection, as with the case with other occupants. The personalized setting data 56 to 58 registered in the memory 47 of the occupant data server apparatus 4 is kept from being inadvertently transmitted and leaked to the automobile 2 even in a case of regular processing. It is possible to permit the use of the personalized setting data 56 to 58 only within a limited range of the automobile 2 registered together with the occupant. In the personalized setting data 56 to 58 regarding the respective occupants, the vehicle identification data regarding a plurality of the automobiles 2 used by each occupant may be registered.

Thus, the combination authentication processor 74 is configured to authenticate the combination of the occupant authenticated by the "occupant authentication processor" and the vehicle for which the occupant is authenticated.

The setting processor 75 may provide the automobile 2 with the occupant-dependent setting in accordance with the occupant on board. For example, as illustrated in FIG. 2, the setting in the automobile 2 may include the travel setting for each occupant, e.g., the seat position, and setting for the network services available in the automobile 2 to the occupant. Upon acquiring the approval of the connection by the authentication of the combination from the combination authentication processor 74, the setting processor 75 may receive and acquire the personalized setting data regarding the occupant related to the approval of the connection, from the personalized setting data 56 to 58 held in the memory 47 of the occupant data server apparatus 4. The personalized setting data to be acquired from the occupant data server apparatus 4 may include, without limitation, the account data at the network service. In addition, for example, the personalized setting data to be acquired from the occupant data server apparatus 4 may include, without limitation, the vehicle setting data.

Upon acquiring the approval of the connection from the combination authentication processor 74, or upon the authentication of the occupant by the device authentication processor 72 or the biometric authentication processor 71, the setting processor 75 may acquire the personalized setting data regarding the occupant related to the approval from the personalized setting data 51 to 53 held in the vehicle memory 22 of the automobile 2.

On the basis of the setting data acquired, the setting processor 75 may provide each part of the automobile 2 with the setting, with the use of the vehicle setting device 34. For example, the setting processor 75 may provide the setting of, for example, the seat position, the steering wheel position, the mirror position, the display setting, the operation setting, the navigation setting, and the travel setting. This makes it possible for the occupant on board the automobile 2 to obtain optimal environment for a drive. For example, it is possible to operate the steering wheel, while being seated on the seat, for example, at an optimal position.

Moreover, in a case where the account data at the network service is acquired as the personalized setting data, the setting processor 75 may allow the media connection processor 73 to establish the connection to the service providing apparatus that provides the network service. The media connection processor 73 may transmit the account data from the mobile communication equipment 25 to the service providing apparatus on the basis of an instruction by the setting processor 75 to establish the connection. The service providing apparatus may compare the received account data with the occupant authentication data. In a case where they coincide, the service providing apparatus may approve the connection. The connection of the media connection processor 73 to the service providing apparatus makes it possible for the control system 3 of the automobile 2 to transmit and receive data to and from the service providing apparatus that provides the network service, through the mobile communication equipment 25.

With such setting, the setting processor 75 is configured to provide the automobile 2 with the setting in accordance with the authenticated occupant, and provide the setting of the connection to the network services to be used in the automobile 2 by the authenticated occupant. The setting processor 75 may automatically provide the setting on the basis of the authentication of the occupant on board the automobile 2. This saves the occupant from operating the vehicle operation device 33 on their own. It is possible for the occupant to obtain optimal environment for a drive and start travel immediately.

Figure 5:
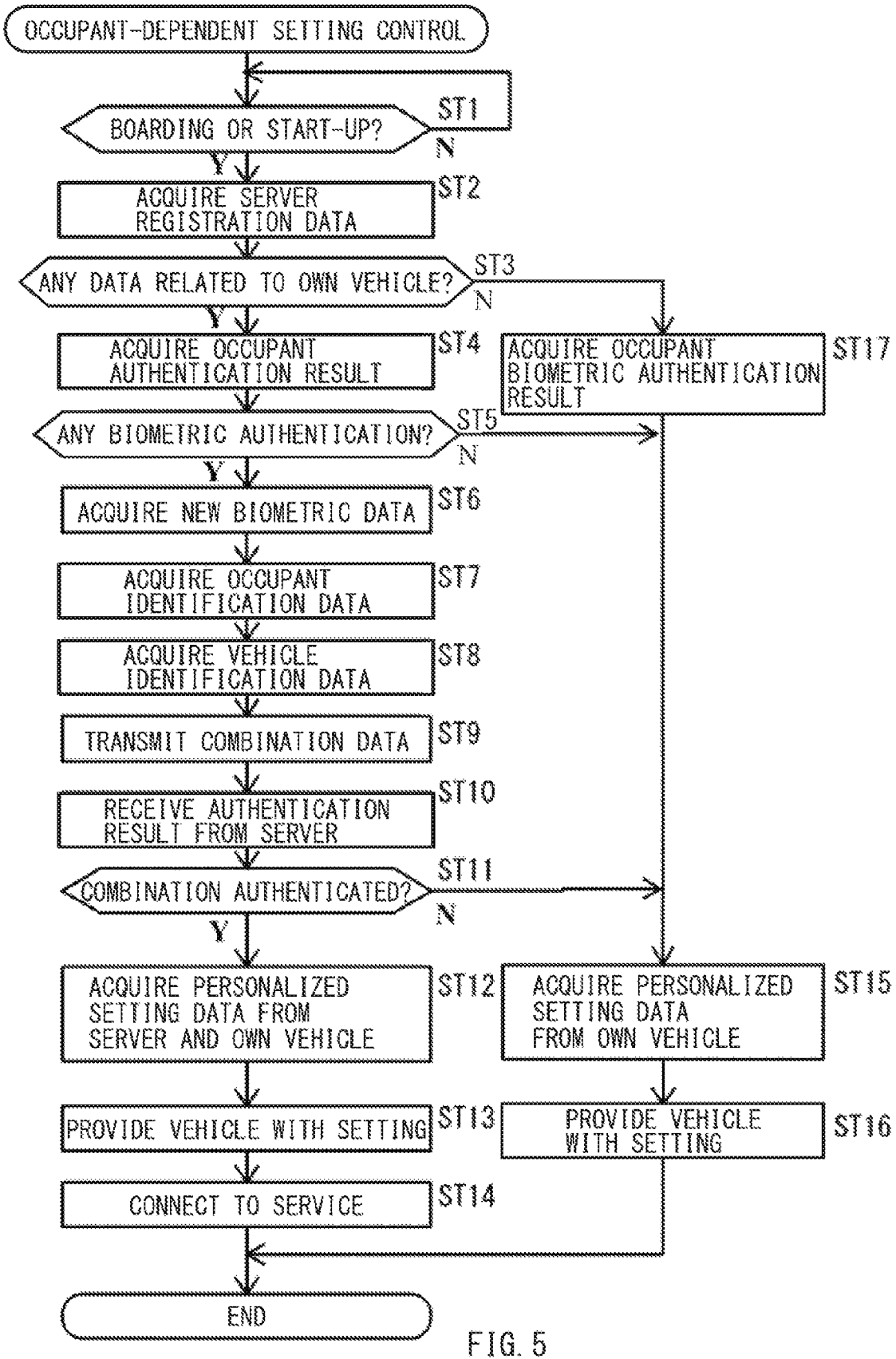
FIG. 5 is a flowchart of a setting control in accordance with an occupant on board the automobile, by the control system of the automobile in FIG. 1.

FIG. 5 is a flowchart of a setting control in accordance with the occupant on board the automobile 2, by the control system 3 of the automobile 2 in FIG. 1.

The vehicle ECU 21 of the control system 3 of the automobile 2 may repetitively carry out the setting control in FIG. 5.

With the setting control in FIG. 5, the vehicle ECU 21 may serve as the plurality of the processors assigned to the automobile 2 as illustrated in, for example, FIG. 4.

In step ST1, the vehicle ECU 21 may determine whether or not a new occupant gets in the automobile 2, or whether or not the automobile 2 makes a start-up with the occupant on board. The vehicle ECU 21 may determine whether or not the new occupant gets in the automobile 2 on the basis of, for example, detection of the opening or closing by the door opening and closing sensor 28, new detection of the occupant terminal 5 by the short-range communication equipment 26, and/or new detection of the occupant key 6 by the key proximity sensor 27.

In step ST2, the vehicle ECU 21 may inquire of the occupant data server apparatus 4 a registration state with the use of the mobile communication equipment 25, and acquire presence or absence of server registration data regarding an own vehicle from the occupant data server apparatus 4. Note that the automobile 2 is also referred to as the own vehicle.

In step ST3, the vehicle ECU 21 may determine whether or not data related to the own vehicle is registered in the server registration data acquired from the occupant data server apparatus 4. In a case where the data related to the own vehicle is registered in the occupant data server apparatus 4, the vehicle ECU 21 may cause the flow to proceed to step ST4. In a case where the data related to the own vehicle is not registered in the occupant data server apparatus 4, the vehicle ECU 21 may cause the flow to proceed to step ST17.

In step ST4, the vehicle ECU 21 may acquire the occupant authentication result of the occupant on board the automobile 2.

The biometric authentication processor 71 may compare physical features of the occupant on board the automobile 2 obtained from the captured image with the occupant biometric data registered in the personalized setting data 51 to 53 regarding the plurality of the occupants in the vehicle memory 22. The biometric authentication processor 71 may determine whether or not the occupant on board the automobile 2 is registered in the vehicle memory 22. In a case where the occupant on board the automobile 2 is registered in the vehicle memory 22, the biometric authentication processor 71 may authenticate the occupant as registered.

The device authentication processor 72 may compare the identification data regarding the occupant terminal 5 or the identification data regarding the occupant key 6 of the occupant on board the automobile 2 with the occupant terminal data registered in the personalized setting data 51 to 53 regarding the plurality of the occupants in the vehicle memory 22. The device authentication processor 72 may determine whether or not the occupant on board the automobile 2 is registered in the vehicle memory 22. In a case where the occupant on board the automobile 2 is registered in the vehicle memory 22, the device authentication processor 72 may authenticate the occupant as registered.

The vehicle ECU 21 may acquire, from the biometric authentication processor 71 and the device authentication processor 72, the occupant authentication result of the occupant on board the automobile 2.

In step ST5, the vehicle ECU 21 may determine whether or not the acquired occupant authentication result includes the biometric authentication result. In a case where the biometric authentication processor 71 authenticates the occupant related to the authentication as registered, the vehicle ECU 21 may determine that the acquired occupant authentication result includes the biometric authentication result regardless of the authentication result by the device authentication processor 72, and cause the flow to proceed to step ST6. In a case where the biometric authentication processor 71 does not authenticate the occupant related to the authentication as registered, the vehicle ECU 21 may determine that the acquired occupant authentication result does not include the biometric authentication result, and cause the flow to proceed to step ST15.

In step ST6, the vehicle ECU 21 may acquire new biometric data regarding the biometric-authenticated occupant from the occupant monitoring device 31 or the in-vehicle camera 30. In one embodiment of the technology, the occupant monitoring device 31 may serve as a "biometric data acquisition processor" configured to acquire biometric data regarding the occupant on board. In one example, the biometric data to be acquired by the vehicle ECU 21 in step ST6 may be different from the biometric data on the occasion of the biometric authentication result acquired in step ST4. The biometric data in step ST6 may include, for example, the captured image taken by the in-vehicle camera 30 at timing later than the biometric data in step ST4, or biometric data to be generated by the occupant monitoring device 31 with respect to the captured image at the later timing. The two-stage authentication based on the different pieces of the biometric data makes it possible to enhance precision of the biometric authentication.

In step ST7, the vehicle ECU 21 may acquire the occupant identification data regarding the biometric-authenticated occupant from the personalized setting data 51 to 53 in the vehicle memory 22.

In step ST8, the vehicle ECU 21 may acquire the vehicle identification data 54 regarding the own vehicle from the vehicle memory 22.

In step ST9, the vehicle ECU 21 may transmit combination data of the occupant and the automobile 2 acquired in steps ST7 to ST8 to the occupant data server apparatus 4 through the base station 7 and the communication network 8 with the use of the mobile communication equipment 25. The occupant data server apparatus 4 may allow the combination authentication processor 74 to compare the received combination data with the combination in the personalized setting data 56 to 58 regarding the plurality of the occupants registered in the memory 47 of the occupant data server apparatus 4. In a case where the received combination data is registered in the memory 47 of the occupant data server apparatus 4, the combination authentication processor 74 of the occupant data server apparatus 4 may authenticate the combination and transmit the authentication result of the combination to the automobile 2 through the communication device 41, the base station 7, and the communication network 8.

In step ST10, the vehicle ECU 21 may receive and acquire, from the occupant data server apparatus 4, with the mobile communication equipment 25, the authentication result by the combination authentication processor 74 with respect to the combination data of the occupant and the automobile 2.

In step ST11, the vehicle ECU 21 may determine whether or not the combination included in the combination data of the occupant and the automobile 2 is authenticated by the combination authenticating processor 74 in the occupant data server apparatus 4. In a case where the combination is authenticated in the occupant data server apparatus 4, the vehicle ECU 21 may cause the flow to proceed to step ST12. In a case where the combination is unauthenticated in the occupant data server apparatus 4, the vehicle ECU 21 may cause the flow to proceed to step ST15.

In step ST12, the vehicle ECU 21 may acquire the personalized setting data regarding the authenticated occupant from the personalized setting data 56 to 58 regarding the plurality of the occupants in the memory 47 of the occupant data server apparatus 4 and the personalized setting data 51 to 53 regarding the plurality of the occupants in the vehicle memory 22 of the own vehicle. The vehicle ECU 21 may request, with the use of the mobile communication equipment 25, the occupant data server apparatus 4 to transmit the setting data. The vehicle ECU 21 may receive and acquire the personalized setting data regarding the combination-authenticated occupant from the occupant data server apparatus 4. The vehicle ECU 21 may read and acquire the personalized setting data regarding the authenticated occupant from the vehicle memory 22.

The vehicle ECU 21 may acquire the personalized setting data regarding the combination-authenticated occupant mainly from, for example, the memory 47 of the occupant data server apparatus 4. In a case where the setting data acquired from the memory 47 of the occupant data server apparatus 4 does not include the vehicle setting data, the vehicle ECU 21 may acquire the personalized setting data from the personalized setting data 51 to 53 regarding the plurality of the occupants in the vehicle memory 22 of the own vehicle. In this case, the vehicle ECU 21 may acquire the personalized setting data regarding the combination-authenticated occupant from at least the memory 47 of the occupant data server apparatus 4, out of the memory 47 of the occupant data server apparatus 4 and the vehicle memory 22 of the automobile 2.

In step ST13, the vehicle ECU 21 may provide the own vehicle with the setting, with the use of the vehicle setting device 34, on the basis of the personalized vehicle setting data included in the personalized setting data acquired. Thus, the setting of, for example, the seat position for the occupant related to the authentication may be provided, corresponding to the personalized vehicle setting data.

In step ST14, the vehicle ECU 21 may couple the own vehicle to the network service, with the mobile communication equipment 25, with the use of the account data at the network service included in the personalized setting data acquired. Thus, the vehicle ECU 21 may be coupled to the service providing apparatus that provides the network service, through the mobile communication equipment 25, and become ready to receive the service information from the service providing apparatus. Thereafter, the vehicle ECU 21 may end the control.

In step ST15, because the combination is unauthenticated by the combination authentication processor 74 of the occupant data server apparatus 4, the vehicle ECU 21 may stop data acquisition from the occupant data server apparatus 4, and acquire the personalized setting data regarding the authenticated occupant from the personalized setting data 51 to 53 regarding the plurality of the occupants in the vehicle memory 22 of the own vehicle. The authentication in this case may be made solely by either the biometric authentication processor 71 or the device authentication processor 72. In a case where the authentication is made by the biometric authentication processor 71, the device authentication processor 72, or both, the vehicle ECU 21 may acquire the personalized setting data regarding the occupant related to the authentication.

In step ST16, the vehicle ECU 21 may provide the own vehicle with the setting on the basis of the personalized vehicle setting data included in the personalized setting data acquired from the vehicle memory 22. Thus, the setting of, for example, the seat position for the occupant related to the authentication may be provided, corresponding to the personalized vehicle setting data. Thereafter, the vehicle ECU 21 may end the control.

In step ST17, the vehicle ECU 21 may acquire the occupant authentication result of the occupant on board the automobile 2.

In this case, because the data related to the own vehicle is not registered in the occupant data server apparatus 4, unlike step ST4, the vehicle ECU 21 may acquire only the biometric authentication result by the biometric authentication processor 71, out of the authentication result by the biometric authentication processor 71 and the authentication result by the device authentication processor 72.

Thereafter, the vehicle ECU 21 may cause the flow to proceed to step ST15. The vehicle ECU 21 may acquire the personalized setting data regarding the biometric-authenticated occupant from the personalized setting data 51 to 53 regarding the plurality of the occupants in the vehicle memory 22 of the own vehicle, and provide the own vehicle with the setting on the basis of the acquired vehicle setting data. Thereafter, the vehicle ECU 21 may end the control.

As described, in the setting control in FIG. 5, in the case where the occupant is biometric-authenticated by the biometric authentication processor 71, the vehicle ECU 21 may transmit the combination data of the occupant and the automobile 2 to the occupant data server apparatus 4. The combination authentication processor 74 of the occupant data server apparatus 4 may authenticate the combination of the occupant and the automobile 2 by the combination of the occupant identification data regarding the occupant biometric-authenticated by the biometric authentication processor 71 and the vehicle identification data regarding the automobile 2 for which the authentication is made. In the case where the occupant of the automobile 2 is biometric-unauthenticated by the biometric authentication processor 71, the combination authentication processor 74 may refrain from making the authentication because the combination authentication processor 74 does not obtain the combination data of the occupant and the automobile 2.

It is to be noted that the two-stage authentication of the occupant on board the automobile 2 may be carried out without the forgoing processes of steps ST1 to ST3.

In one alternative, instead of the processes of steps ST1 to ST3, the vehicle ECU 21 may determine, for example, presence or absence, in the vehicle memory 22, of connection data to the occupant data server apparatus 4. In a case with the presence of the connection data, the vehicle ECU 21 may cause the flow to proceed to step ST4. In a case with the absence of the connection data, the vehicle ECU 21 may cause the flow to proceed to step ST17.

Figure 6:
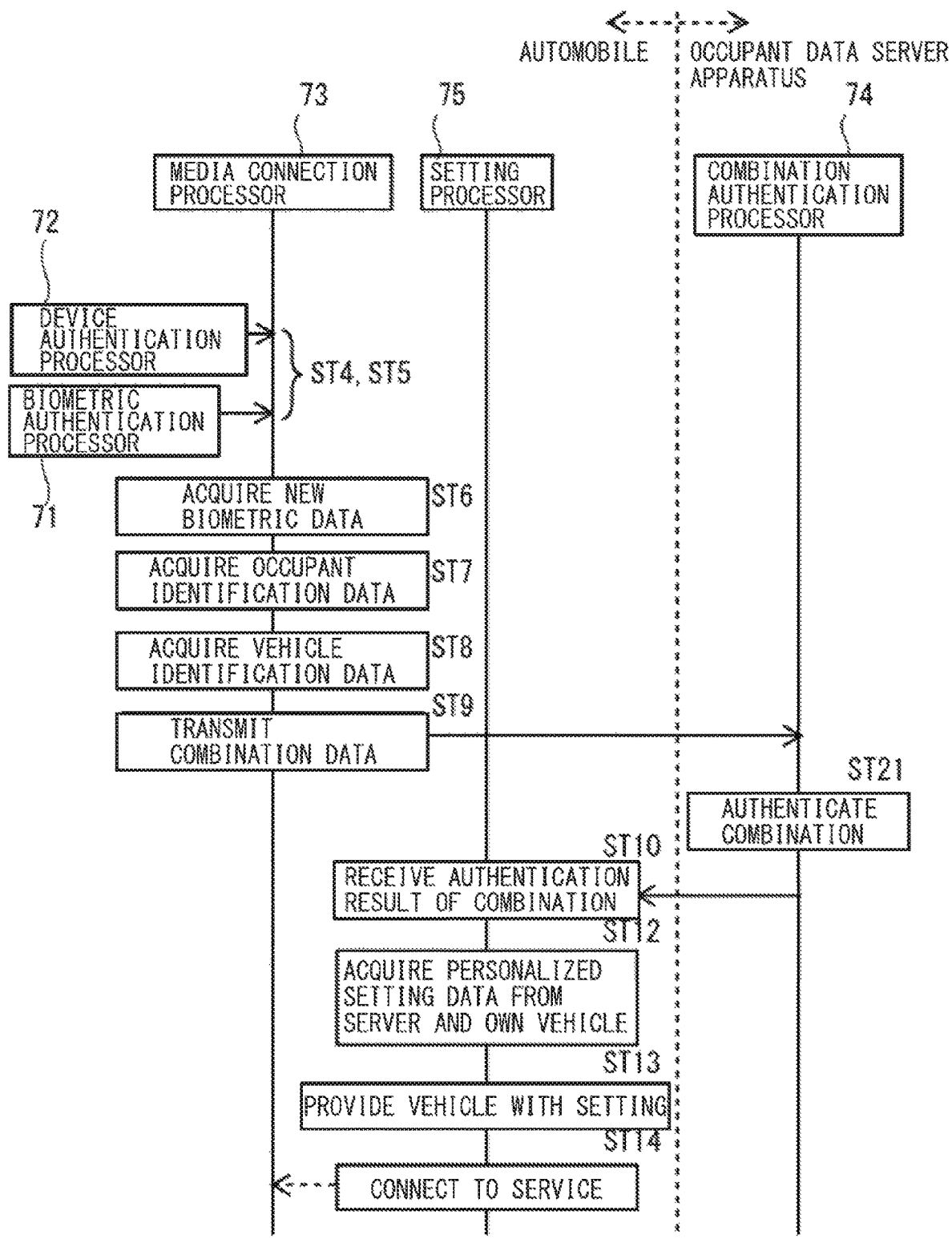
FIG. 6 is a timing chart of the setting control in a case of two-stage authentication of the occupant in the vehicle setting system in FIG. 1.

FIG. 6 is a timing chart of the setting control in the case with the two-stage authentication of the occupant in the vehicle setting system 1 for the automobile 2 in FIG. 1.

The timing chart of the setting control in FIG. 6 is an example case where the occupant on board the automobile 2 is biometric-authenticated.

FIG. 6 illustrates the combination authentication processor 74 that is realized on the CPU 45 of the occupant data server apparatus 4, together with the biometric authentication processor 71, the device authentication processor 72, the media connection processor 73, and the setting processor 75 that are realized on the vehicle ECU 21 of the automobile 2. In FIG. 6, time flows from top to bottom.

In the following, description is given of an example of a state in which the first occupant is on board the automobile 2. The description assumes that the vehicle ECU 21 of the automobile 2 carries out the setting processing in FIG. 5 mainly as the media connection processor 73.

In step ST4 in FIG. 5, the vehicle ECU 21 as the media connection processor 73 of the automobile 2 may acquire the occupant authentication result by the biometric authentication processor 71 and the occupant authentication result by the device authentication processor 72 for the first occupant on board the automobile 2. In step ST5, the vehicle ECU 21 as the media connection processor 73 of the automobile 2 may determine that the biometric authentication result is included. In this case, in steps ST6 to ST9, the vehicle ECU 21 as the media connection processor 73 may acquire the occupant identification data, the new biometric data, and the vehicle identification data 54 regarding the first occupant on board the automobile 2, from the first occupant setting data 51 in the vehicle memory 22. The vehicle ECU 21 as the media connection processor 73 may transmit the data acquired to the occupant data server apparatus 4. The communication device 41 of the occupant data server apparatus 4 may receive the combination data, and thereupon, in step ST21, the combination authentication processor 74 may compare the received combination data with the personalized setting data 56 to 58 regarding the plurality of the occupants in the memory 47 of the occupant data server apparatus 4, and authenticate the combination. The combination authentication processor 74 may authenticate the combination on the basis of the biometric data acquired at different timing from the biometric data used in the authentication by the biometric authentication processor 71. Thereafter, the combination authentication processor 74 may transmit the authentication result of the combination indicating that the first occupant is the registered occupant, to the setting processor 75 of the automobile 2. The authentication result may be transmitted from the communication device 41 of the occupant data server apparatus 4 to the automobile 2 through the communication network 8 and the base station 7.

In the automobile 2, in step ST10, the vehicle ECU 21 as the setting processor 75 may receive the authentication result by the combination authentication processor 74 of the combination data of the occupant and the automobile 2, from the occupant data server apparatus 4, with the mobile communication equipment 25.

The vehicle ECU 21 of the automobile 2, as the media connection processor 73, may instruct the setting processor 75 to provide setting. In steps ST12 to ST14, the vehicle ECU 21, as the setting processor 75, may acquire the personalized setting data regarding the first occupant from the personalized setting data 56 to 58 regarding the plurality of the occupants in the occupant data server apparatus 4 and the personalized setting data 51 to 53 regarding the plurality of the occupants in the vehicle memory 22. The vehicle ECU 21 of the automobile 2, as the setting processor 75, may provide the own vehicle with the setting, and establish the connection to the network service.

At this occasion, for example, as for the personalized vehicle setting data, even in a case where the setting processor 75 acquires various setting from the occupant data server apparatus 4, the setting processor 75 may prioritize the setting that is held in the vehicle memory 22 and corresponds to the setting acquired from the occupant data server apparatus 4, and provide the own vehicle with the setting. Moreover, in a case where the setting processor 75 fails to acquire the setting from the vehicle memory 22, the setting processor 75 may acquire the vehicle setting data from the occupant data server apparatus 4 and provide the own vehicle with the setting.

Thus, in the case where the combination of the first occupant and the automobile 2 is authenticated by the combination authentication processor 74, the setting processor 75 may acquire the personalized setting data regarding the first occupant from the personalized setting data 56 to 58 regarding the plurality of the occupants in the memory 47 of the occupant data server apparatus 4, and provide the own vehicle with the setting. In one embodiment of the technology, the memory 47 may serve as the "server memory".

For example, in the case where the personalized setting data regarding the first occupant held in the memory 47 of the occupant data server apparatus 4 includes the personalized vehicle setting data to be set in the automobile 2 in accordance with the occupant, and the combination is authenticated, the setting processor 75 may provide the automobile 2 with the setting with the use of the vehicle setting data held in the memory 47 of the occupant data server apparatus 4.

In addition, for example, in the case where the personalized setting data regarding the first occupant held in the memory 47 of the occupant data server apparatus 4 includes the account data at the network service available in the automobile 2 to the occupant, and the combination is authenticated, the setting processor 75 may couple the automobile 2 to the network service with the use of the account data at the network service from the memory 47 of the occupant data server apparatus 4.

Moreover, in the case where the first occupant is biometric-authenticated by the biometric authentication processor 71 of the automobile 2 and the combination of the first occupant and the automobile 2 is authenticated by the combination authentication processor 74, the setting processor 75 may acquire the vehicle setting data regarding the first occupant from the personalized setting data 56 to 58 regarding the plurality of the occupants in the memory 47 of the occupant data server apparatus 4 and the personalized setting data 51 to 53 regarding the plurality of the occupants in the vehicle memory 22 as the "vehicle memory", and provide the automobile 2 with the setting.

Moreover, in the case where the first occupant is authenticated by the biometric authentication processor 71 and the combination of the first occupant and the automobile 2 is unauthenticated by the combination authentication processor 74, the setting processor 75 may acquire the vehicle setting data regarding the first occupant solely from the personalized setting data 51 to 53 regarding the plurality of the occupants in the vehicle memory 22 as the "vehicle memory", and provide the automobile 2 with the setting.

As described, in this embodiment, in the case where the occupant on board the automobile 2 wants to provide the automobile 2 with the setting of the personalized setting data regarding themselves held in the memory 47 of the occupant data server apparatus 4, and use the personalized setting data, the occupant has to be authenticated by the combination authentication processor 74. The combination authentication processor 74 may authenticate not simply the occupant on board the automobile 2, but the combination of the occupant on board the automobile 2 and the automobile 2 with the occupant on board. Thus, for example, in the case where the automobile 2 with the occupant on board is different from that held in the memory 47, the combination is unauthenticated. This makes it possible to enhance safety of the personalized setting data held in the memory 47, as compared to the case with the authentication of solely the occupant on board.

In contrast, in the case where the authenticated occupant gets in the authenticated automobile 2 registered, it is possible to get the authentication of the combination, provide the automobile 2 with the setting of the personalized setting data regarding themselves held in the memory 47, and use the personalized setting data. This leads to convenience of the authenticated use, without limiting the use of personalized setting data in the authenticated automobile 2 by the authenticated occupant.

Thus, in this embodiment, it is possible to enhance safety of the personalized setting data for each occupant who uses the automobile 2, while ensuring convenience of the authenticated use.

Although some example embodiments of the technology have been described in the forgoing by way of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

For example, in the forgoing embodiments, the automobile 2 includes the biometric authentication processor 71 together with the setting processor 75. The setting processor 75 is configured to provide the setting to make the occupant-dependent setting available in the automobile 2. The biometric authentication processor 71 is configured to authenticate the occupant on board the automobile 2.

In an alternative example, the automobile 2 may include the combination authentication processor 74 together with the setting processor 75 and the biometric authentication processor 71. The combination authentication processor 74 is configured to authenticate the combination of the occupant authenticated by the biometric authentication processor 71 and the automobile 2 with the occupant on board.

The vehicle ECU 21 and the CPU 45 illustrated in FIGS. 2 and 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle ECU 21 and the CPU 45 illustrated in FIGS. 2 and 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle ECU 21 and the CPU 45 illustrated in FIGS. 2 and 3.

The invention claimed is:

1. An occupant-dependent setting system for a vehicle, the occupant-dependent setting system comprising:
    a setting processor that provides the vehicle with a setting to make occupant-dependent setting available in the vehicle;
    a combination authentication processor that authenticates a combination of an occupant on board the vehicle and the vehicle;
    an occupant authentication processor that authenticates the occupant on board the vehicle;
    a biometric data acquisition processor that acquires biometric data regarding the occupant on board the vehicle; and
    a memory that holds personalized setting data, the personalized setting data being made available in the vehicle to the occupant on board the vehicle on a condition that the combination authentication processor authenticates the combination of the occupant and the vehicle, the memory comprising a server memory of a server apparatus, the server memory holding personalized vehicle setting data regarding the occupant on board the vehicle, wherein
    on the condition that the combination authentication processor authenticates the combination of the occupant and the vehicle, the setting processor acquires the personalized setting data regarding the occupant authenticated by the combination authentication processor from the memory and provides the vehicle with the setting,
    the setting varies with an authentication state by the occupant authentication processor and an authentication state by the combination authentication processor,
    the combination authentication processor and the occupant authentication processor separately acquire the biometric data regarding the occupant from the biometric data acquisition processor and respectively authenticate the combination of the occupant and the vehicle,
    the vehicle comprises a vehicle memory holding personalized vehicle setting data regarding the occupant on board the vehicle, and
    the setting processor:
        acquires the personalized setting data regarding the occupant authenticated by the combination authentication processor, from at least the server memory of the server apparatus and the vehicle memory of the vehicle, and provides the vehicle with the setting, on the condition that the combination authentication processor authenticates the combination of the occupant and the vehicle; and
        acquires the personalized vehicle setting data regarding the occupant authenticated by the occupant authentication processor from the vehicle memory of the vehicle and provides the vehicle with the setting, on a condition that (i) the combination authentication processor does not authenticate the combination of the occupant and the vehicle and (ii) the occupant authentication processor authenticates the occupant.

2. The occupant-dependent setting system for the vehicle according to claim 1, wherein
    the combination authentication processor:
        authenticates the combination of the occupant on board the vehicle and the vehicle with the occupant on board, on a condition that the occupant authentication processor biometrically authenticates the occupant on board the vehicle; and refrains from authenticating the combination on a condition that the occupant authentication processor does not biometrically authenticate the occupant on board the vehicle.

3. The occupant-dependent setting system for the vehicle according to claim 1, wherein
the personalized setting data held in the server memory includes account data at a network service available in the vehicle to the occupant, and on the condition that the combination authentication processor authenticates the combination of the occupant and the vehicle, the setting processor acquires the account data at the network service from the server memory of the server apparatus and couples the vehicle to the network service.

4. The occupant-dependent setting system for the vehicle according to claim 3, wherein
the personalized setting data to be held in the server memory includes the personalized vehicle setting data to be set in the vehicle in accordance with the occupant, and
on the condition that the combination authentication processor authenticates the combination of the occupant and the vehicle, the setting processor acquires the personalized vehicle setting data from the server memory of the server apparatus and provide the vehicle with the setting.

5. The occupant-dependent setting system for the vehicle according to claim 1, wherein
the personalized setting data held in the server memory includes the personalized vehicle setting data to be set in the vehicle in accordance with the occupant, and
on the condition that the combination authentication processor authenticates the combination of the occupant and the vehicle, the setting processor acquires the personalized vehicle setting data from the server memory of the server apparatus and provide the vehicle with the setting.

6. A vehicle comprising:
a setting processor configured to provide the vehicle with a setting to make occupant- dependent setting available in the vehicle; and
a vehicle memory holding personalized vehicle setting data regarding the occupant on board the vehicle, wherein
on the condition that a combination authentication processor authenticates a combination of an occupant and the vehicle, the setting processor acquires personalized setting data regarding the occupant authenticated by the combination authentication processor from the vehicle memory and provides the vehicle with the setting,
the setting varies with an authentication state by an occupant authentication processor and an authentication state by the combination authentication processor,
the combination authentication processor and the occupant authentication processor separately acquire biometric data regarding the occupant and respectively authenticate the combination of the occupant and the vehicle, and
the setting processor:
acquires the personalized setting data regarding the occupant authenticated by the combination authentication processor, from at least server memory of a server apparatus and the vehicle memory of the vehicle, and provides the vehicle with the setting, on the condition that the combination authentication processor authenticates the combination of the occupant and the vehicle; and
acquires the personalized vehicle setting data regarding the occupant authenticated by the occupant authentication processor from the vehicle memory of the vehicle and provides the vehicle with the setting, on a condition that (i) the combination authentication processor does not authenticate the combination of the occupant and the vehicle and (ii) the occupant authentication processor authenticates the occupant.

7. The vehicle according to claim 6, wherein
the combination authentication processor is provided in the server apparatus.

8. A vehicle comprising:
circuitry being at least configured to provide the vehicle with a setting to make occupant-dependent setting available in the vehicle, and
a vehicle memory holding personalized vehicle setting data regarding the occupant on board the vehicle, wherein out of:
on the condition that a combination of the occupant and the vehicle is authenticated, the circuitry acquires personalized setting data regarding the authenticated occupant from the vehicle memory and provide the vehicle with the setting,
the setting varies with an authentication state by occupant authentication circuitry and an authentication state by the circuitry,
the circuitry acquires biometric data regarding the occupant and authenticates the combination of the occupant and the vehicle, and
the circuitry:
acquires the personalized setting data regarding the authenticated occupant, from at least server memory of a server apparatus and the vehicle memory of the vehicle, and provides the vehicle with the setting, on the condition that the circuitry authenticates the combination of the occupant and the vehicle; and
acquires the personalized vehicle setting data regarding the authenticated occupant from the vehicle memory of the vehicle and provides the vehicle with the setting, on a condition that (i) the circuitry does not authenticate the combination of the occupant and the vehicle and (ii) the occupant authentication circuitry authenticates the occupant.

* * * * *